May 9, 1933.  E. M. SWIFT ET AL  1,908,457
TRUCK BODY
Filed April 7, 1930   2 Sheets-Sheet 1

INVENTORS.
Edwin M. Swift
Michael I. Holdeman.
BY
ATTORNEY.

May 9, 1933.  E. M. SWIFT ET AL  1,908,457
TRUCK BODY
Filed April 7, 1930  2 Sheets-Sheet 2
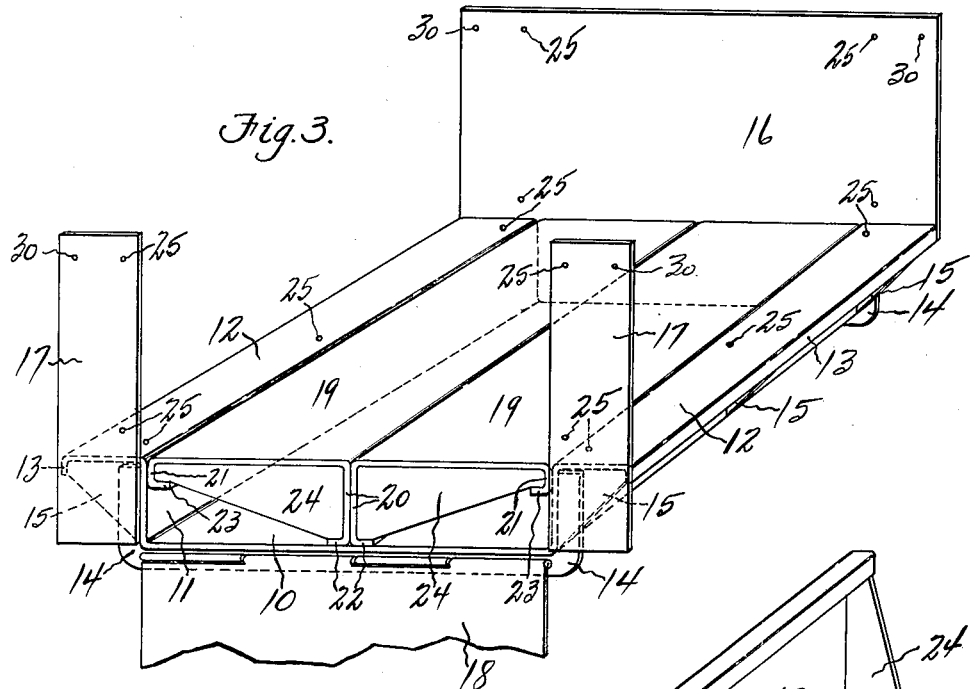
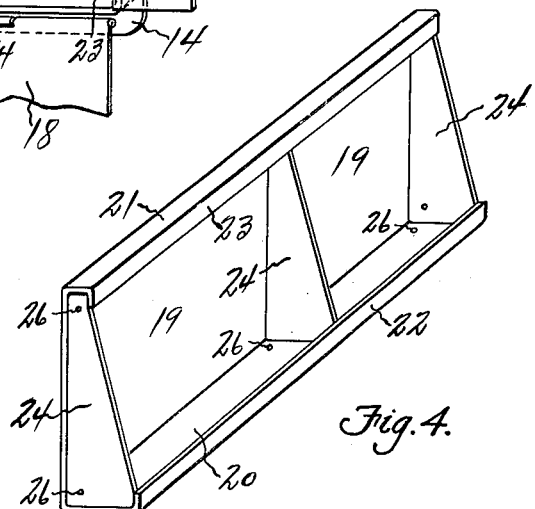
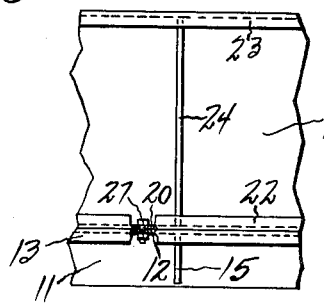
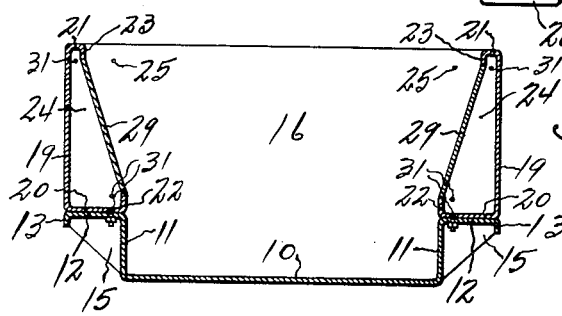
INVENTORS.
Edwin M. Swift.
Michael I. Holdeman.
BY George J. Utsch
ATTORNEY.

Patented May 9, 1933

1,908,457

UNITED STATES PATENT OFFICE

EDWIN M. SWIFT, OF SOUTH BEND, AND MICHAEL I. HOLDEMAN, OF ELKHART, INDIANA

TRUCK BODY

Application filed April 7, 1930. Serial No. 442,276.

The invention relates to truck bodies, and has for its object to provide a device of this character which is readily and easily convertible from a narrow box-type body to a wide platform-type body.

A further object is to provide a device of this character in which part of the side walls of a box-type truck body are adapted to be shifted to form part of the platform of a platform type body in a plane above the bottom of said truck body.

A further object is to provide a truck body having a shallow box from the upper ends of which horizontal ledge panels project at each side, and side panels adapted to be normally mounted and secured on said ledge panels in upright position in alignment with the side bars of the shallow box to form a box-type body, said side panels being shiftable to horizontal position in the shallow box in alignment with the ledge panels to form a platform-type body.

A further object is to provide a truck body convertible from a box-type to a platform-type body which has suitable supporting and securing means for holding the shiftable side panels in desired operative vertical and horizontal position when in side-forming or platform-forming position.

A further object is to provide a device of this character in which shiftable side panel units are adapted to cooperate with a shallow box body having horizontal ledge panels projecting from the upper ends thereof to form either a box-type or a platform-type truck body, said side panel units comprising side panels having perpendicularly extending flanges projecting from one of the longitudinal edges thereof, said flanges forming a base for the side panels when said panels are disposed in upright position and forming legs to support one side of said panels when horizontally disposed in platform-forming position.

With the above and other objects in view, the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 3 is a perspective view of the truck body with the shiftable side panels disposed in horizontal platform-forming position.

Figure 4 is a perspective view of one of the shiftable side panels.

Figure 5 is a fragmentary view of the truck body in side elevation showing the shiftable side panel in normal side-forming position.

Figure 6 is a transverse vertical sectional view similar to Figure 2 and illustrating a modified construction of the shiftable side panels which permit the positioning thereof to form a box-type body with inclined sides.

Figure 1:
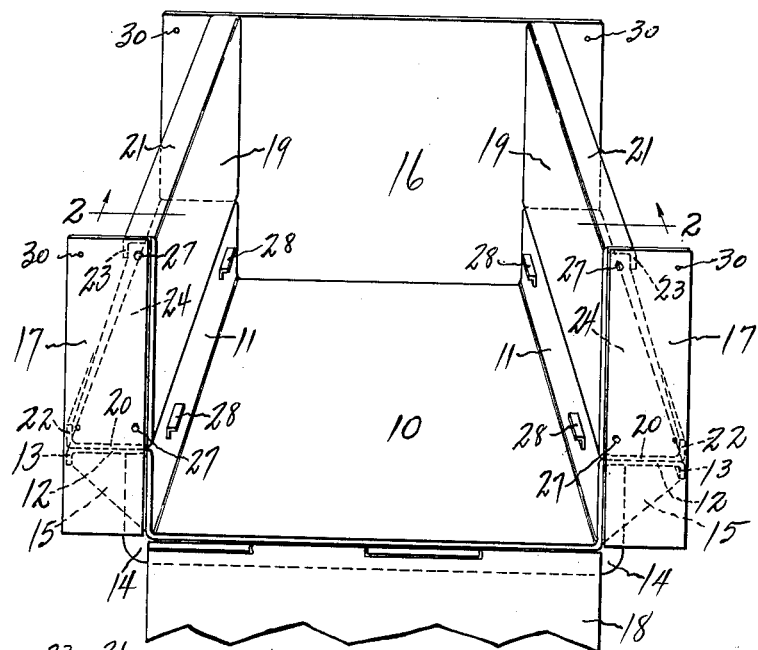
Figure 1 is a perspective view of the truck body with the shiftable side panels disposed in box-forming position.
Figure 2:
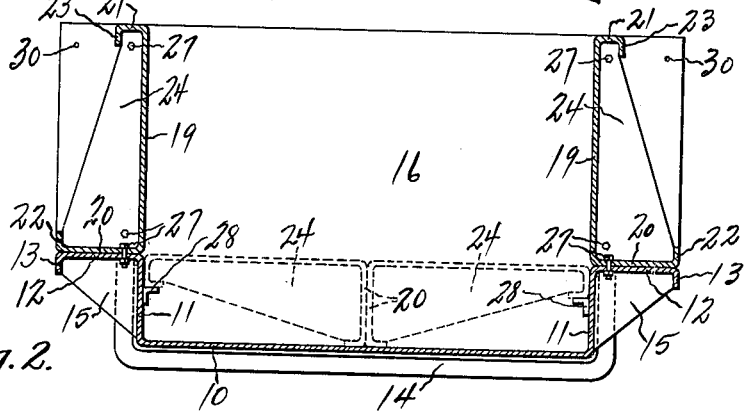
Figure 2 is a transverse vertical sectional view of the truck body taken on line 2—2 of Figure 1.

Referring to the drawings, which illustrate the preferred embodiments of the invention, the numeral 10 designates the bottom of a truck body having shallow side bars 11 and horizontal ledge panels 12 projecting from the upper edges of said side bars, said bottom, side bars and ledge panels being integrally formed of a suitable gauge of heavy sheet metal, and said ledge panels 12 and side bars 11 preferably being formed of equal width. Downwardly directed flanges 13 extend from the outer longitudinal edges of the ledge panels 12. The ends of the bottom 10 and side bars 11 are reinforced with U-shaped angle irons 14 welded thereto, and a plurality of spaced plates 15 are welded to and extend between said side bars 11, ledge panels 12 and flanges 13 to form reinforcing members for said ledge panels. A suitable front end member 16 is welded to the front end of the truck body and extends from the bottom 10 to a point spaced above the ledge panels 12 with its outer edges in alignment with the flanges 13. Vertical end members 17 registering with and of the same width as ledge panels 12 are welded to the rear end of the truck body and extend vertically above the ledge panels the same distance as the front end members 16, the distance which said end members are spaced above the ledge panels being preferably equal to one-half the width of the bottom 10. Suitably hinged to the rear end of the body between end members 17 is an endgate 18.

Side panels 19 are normally disposed in vertical position and extend between the front and rear end members 16 and 17 in alignment with the side bars 11 to form upper extensions of the side bars 11 of the truck body, said panels being of a width equal to one-half the width of the bottom 10 of the body whereby the upper edges of the sides and end members of the body are in the same plane. Integrally formed with each side panel 19 and extending perpendicularly outwardly from the lower longitudinal edge thereof when in vertical side-forming position is a flange 20 extending the length of the panel and of a width equal to the width of the ledge panels and side bars, said flange 20 being mounted on said ledge panel in registering relation therewith to form a base for the side panel when said panel is disposed in normal vertical side-forming position. At the upper longitudinal edge of each side panel 19 and extending perpendicularly outwardly therefrom is a flange 21, said flange 21 extending the length of the panel and being of a width less than the width of flange 20. Reinforcing flanges 22 and 23 extend vertically, upwardly and downwardly respectively, from the outer edges of the flanges 20 and 21. Welded to the outer sides of the side panels at spaced points thereon are a plurality of reinforcing plates 24 which extend between and are welded to the flanges 21 and 23 at the upper portion of the panels and to flanges 20 and 22 at the lower portion of the panels, said reinforcing plates 24 being preferably disposed in alignment with reinforcing plates 15 when said side panels are in operative vertical side-forming position, and cooperating therewith to form a support for the side of the body extending the full height thereof. Apertures 25 are formed in the front and rear end members 16 and 17 and in the ledge panels 12, and apertures 26 are formed in the flanges 20 and outer reinforcing plates 24 is registering relation with apertures 25 when in operative vertical side-forming position, and said registering apertures are adapted to receive bolts 27 by means of which the side panels may be secured in operative side-forming position.

When it is desired to convert the truck body as hereinbefore described from a box-type to a platform-type body, the side panels are removed from their vertical side-forming position and shifted to horizontal position in the body. The flanges 20 are centrally disposed and rest upon the bottom 10 of the body when the side panel is disposed in horizontal position, and the flanges 21 are supported by brackets 28 carried by the side bars 11 of the truck body in spaced relation above the bottom thereof, said flanges 20 and the cooperating brackets 28 and flanges 21 being constructed and proportioned to support panels 19 in the truck body in the plane of the ledge panels 12. The combined width of the two panels 19 being equal to the width of the bottom 10, said panels form an unbroken platform in the plane of the ledge panels and of a width equal to the spacing of the outer edges of the ledge panels, and flanges 20 have face contact at the center of the body and the flanges 21 contact the side bars 11. The spaced reinforcing plates 24 support the side panels against deformation under load when in horizontal position.

A modified construction is illustrated in Figure 6 in which inclined plates 29 extend between the edges of the flanges 22 and 23, supported by the reinforcing plates 24. With this construction the side panel 19 is adapted to be outwardly disposed when in vertical position so that the plates 29 form the upper portions of the sides of the box-type body, and since this body set-up has its sides extending angularly outwardly from the side bars 11 it is obviously of greater cubic capacity than the body having vertical upper side portions extending from the side bars 11. Suitable apertures 30 may be provided in the end members and suitable cooperating stud bolts 31 or the like may be carried by this modified side panel unit to permit the same to be operatively mounted in side-forming position.

It will thus be seen that a truck body construction is provided in which side panels are normally vertically positioned to form the upper portions of the sides of a truck body of the box-type, and in which said panels are easily shiftable from vertical position to horizontal position within the truck body in alignment with outwardly projecting ledge panels disposed above the bottom of the truck body, said horizontally disposed panels cooperating with the ledge panels to form a platform in the plane of the ledge panels and of a width greater than the width of the bottom of the truck body; and in which said body is suitably reinforced against load stresses when said panels are in position to form either a box-type or a platform-type body.

The invention having been set forth, what is claimed as new and useful is:

1. The combination with a truck body having a bottom, shallow side bars, and ledge panels projecting horizontally from the upper edges of said side bars, of side panels forming extensions of said side bars, said side panels being shiftable to horizontal position spanning said bottom to form a load supporting platform in the plane of said ledge panels, and a flange carried by each side panel and extending perpendicularly from one of the longitudinal edges thereof, said flange forming a base for the side panel when in side-forming position and engaging said bottom to form a supporting leg for said side panel when in horizontal position.

2. The combination with a truck body having a bottom, shallow side bars, and ledge panels projecting horizontally from the upper edges of said side bars, of side panels forming extensions of said side bars, said side panels being shiftable to horizontal position in said truck body to form a load supporting platform in combination with and in the plane of said ledge panels, a flange carried by each side panel and extending perpendicularly from one of the longitudinal edges thereof, said flanges being centrally positioned and engaging the bottom to support the inner edges of the side panels when in horizontal position, and means carried by said side bars for supporting the outer edges of said side panels when in horizontal position.

3. The combination with a truck body having a bottom, shallow side bars, and ledge panels projecting horizontally from the upper edges of said side bars, of side panels forming extensions of said side bars, said side panels being shiftable to horizontal position in said truck body to form a load supporting platform in combination with and in the plane of said ledge panels, and reinforcing means carried by said side panels engaging said bottom to support said side panels against lateral stresses when in horizontal position.

4. The combination with a truck body having a bottom, shallow side bars, and ledge panels projecting horizontally from the upper edges of said side bars, of side panels forming extensions of said side bars and being shiftable to horizontal position in the plane of said ledge panels, flanges extending perpendicularly in the same direction from the longitudinal edges of said side panels, a supporting member carried by each side bar, one flange of each side panel being mounted on the bottom of the body and the other flange of each side panel being mounted on one of said supporting members to support said side panels when horizontally positioned.

5. In a convertible truck body, the combination with a bottom plate, ledge plates spaced above and projecting outwardly of the sides of said bottom plate, of panels positioned to form side members of a box body, said panels being shiftable to horizontal position in the plane of said ledge plates to form a load supporting platform spanning said bottom plate, and means carried by said panels mounted on the bottom plate to support said panels when horizontally positioned.

In testimony whereof we affix our signatures.

EDWIN M. SWIFT.
MICHAEL I. HOLDEMAN.